(12) United States Patent
Shiozawa (10) Patent No.: US 12,507,108 B2
(45) Date of Patent: Dec. 23, 2025

(54) INFORMATION PROCESSING APPARATUS, INFORMATION PROCESSING SYSTEM, AND LOG ACQUISITION METHOD (71) Applicant: NEC Corporation, Tokyo (JP)

(72) Inventor: Kenichi Shiozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 399 days.

(21) Appl. No.: 18/206,721

(22) Filed: Jun. 7, 2023

(65) Prior Publication Data

US 2023/0413092 A1 Dec. 21, 2023

(30) Foreign Application Priority Data

Jun. 16, 2022 (JP) .................................. 2022-097343

(51) Int. Cl.
*H04W 24/10* (2009.01)
*G06F 11/34* (2006.01)

(52) U.S. Cl.
CPC .......... *H04W 24/10* (2013.01); *G06F 11/3476* (2013.01)

(58) Field of Classification Search
CPC ............................ H04W 24/10; G06F 11/3476
See application file for complete search history.

(56) References Cited

U.S. PATENT DOCUMENTS

2014/0364112 A1* 12/2014 Persson ................... G06F 11/34
455/422.1
2021/0064500 A1* 3/2021 Przestrzelski ......... G06F 11/079
2022/0382660 A1* 12/2022 Yoo ..................... G06F 11/3075

FOREIGN PATENT DOCUMENTS

JP 2018-097602 A 6/2018

* cited by examiner

*Primary Examiner* — Michael A Keller (57) ABSTRACT

An information processing apparatus, an information processing system, a log acquisition method, and a log acquisition program capable of performing efficient log acquisition processing are provided. An information processing apparatus according to the present disclosure includes a generation unit and an output unit. The generation unit defines one of a plurality of cells managed by a radio base station as a reference cell, and generates a modified log in which information identical to information included in a reference log associated with the reference cell is deleted from information included in a non-reference log associated with a non-reference cell, the non-reference cell being a cell other than the reference cell. The output unit outputs the reference log, the modified log, and information indicating a deleted part of the information included in the non-reference log identical to the information included in the reference log.

13 Claims, 8 Drawing Sheets

| | INFORMATION INCLUDED IN LOG ASSOCIATED WITH CELL #a | INFORMATION INCLUDED IN LOG ASSOCIATED WITH CELL #b | INFORMATION INDICATING DELETED PART OF DELETION INFORMATION |
|---|---|---|---|
| CASE 1 | A B | A B C | L1<br>A̶-B̶-C<br>↑ ↑<br>n1 n2 |
| CASE 2 | A B | C A B | L1<br>C A̶-B̶<br>↑ ↑<br>n1 n2 |
| CASE 3 | A B | A C B | L1  L2<br>A̶-C-B̶<br>↑ ↑ ↑ ↑<br>n1 n2  n3 n4 |

Fig. 1

| | INFORMATION INCLUDED IN LOG ASSOCIATED WITH CELL #a | INFORMATION INCLUDED IN LOG ASSOCIATED WITH CELL #b | INFORMATION INDICATING DELETED PART OF DELETION INFORMATION |
|---|---|---|---|
| CASE 1 | A B | A B C | L1<br>A̶ B̶ C<br>↑ ↑<br>n1 n2 |
| CASE 2 | A B | C A B | L1<br>C A̶ B̶<br>↑ ↑<br>n1 n2 |
| CASE 3 | A B | A C B | L1  L2<br>A̶ C B̶<br>↑ ↑ ↑ ↑<br>n1 n2  n3 n4 |

| INFORMATION INCLUDED IN LOG ASSOCIATED WITH CELL #1 | INFORMATION INCLUDED IN LOG ASSOCIATED WITH CELL #3 |
|---|---|
| PARAMETER 1 (abc) | PARAMETER 1 (abc) |
| PARAMETER 2 (PARAMETER 2-1 (defg), PARAMETER 2-2 (hij)) | PARAMETER 2 (PARAMETER 2-1 (opqr), PARAMETER 2-2 (hij)) |
| PARAMETER 3 (klmn) | PARAMETER 3 (klmn) |
| ... | ... |
| PARAMETER n (xyz) | PARAMETER n (xyz) |

Fig. 5

| INFORMATION INCLUDED IN LOG ASSOCIATED WITH CELL #2 | INFORMATION INCLUDED IN LOG ASSOCIATED WITH CELL #4 | INFORMATION INCLUDED IN LOG ASSOCIATED WITH CELL #5 |
|---|---|---|
| PARAMETER 1 (123) | PARAMETER 1 (123) | PARAMETER 1 (123) |
| PARAMETER 2 (PARAMETER 2-1 ($\alpha$)) | PARAMETER 2 (PARAMETER 2-1 ($\alpha \beta$)) | PARAMETER 2 (PARAMETER 2-1 ($\alpha \beta \gamma$)) |
| PARAMETER 3 (456) | PARAMETER 3 (456) | PARAMETER 3 (456) |
| ... | ... | ... |
| PARAMETER n (xxx) | PARAMETER n (xxx) | PARAMETER n (xxx) |

INFORMATION PROCESSING APPARATUS, INFORMATION PROCESSING SYSTEM, AND LOG ACQUISITION METHOD

INCORPORATION BY REFERENCE

This application is based upon and claims the benefit of priority from Japanese patent application No. 2022-097343, filed on Jun. 16, 2022, the disclosure of which is incorporated herein in its entirety by reference.

TECHNICAL FIELD

The present disclosure relates to an information processing apparatus, an information processing system, a log acquisition method, and a log acquisition program.

BACKGROUND ART

In recent years, communication technologies for a fifth generation (5G) mobile communication system have been developed. 5G radio waves have characteristics such as high straightness and easy disconnection. Hence, operation verification is essential to achieve a stable network operation. Therefore, collecting logs for operation verification in a radio base station apparatus system and detecting anomalies using these logs has been proposed.

For example, Japanese Unexamined Patent Application Publication No. 2018-097602 discloses an information processing apparatus that acquires log information associated with information to be processed and managing it.

The information processing apparatus disclosed in the aforementioned Japanese Unexamined Patent Application Publication No. 2018-097602 manages the capacity of the log by compressing it in order to reduce the amount of information in the log. The amount of information in the log is not sufficiently reduced only by performing the above log acquisition processing, since the number of logs increases as the number of cells supported by the radio base station apparatus system increases. In the future, more efficient log acquisition methods are desired.

SUMMARY

The present disclosure has been made in view of the above-described circumstances, and an object thereof is to provide an information processing apparatus, an information processing system, and a log acquisition method that are capable of performing efficient log acquisition processing.

An information processing apparatus according to one example aspect of the present disclosure includes:
  a generation unit configured to define one of a plurality of cells managed by a radio base station as a reference cell, and generate a modified log in which information identical to information included in a reference log that is associated with the reference cell is deleted from information included in a non-reference log that is associated with a non-reference cell, the non-reference cell being a cell other than the reference cell; and
  an output unit configured to output the reference log, the modified log, and information indicating a deleted part of the information included in the non-reference log that is identical to the information included in the reference log.

An information processing system according to one example aspect of the present disclosure includes:
  an information processing apparatus comprising: a generation unit configured to define one of a plurality of cells managed by a radio base station as a reference cell, and generate a modified log in which information identical to information included in a reference log that is associated with the reference cell is deleted from information included in a non-reference log that is associated with a non-reference cell, the non-reference cell being a cell other than the reference cell; and an transmission unit configured to transmit the reference log, the modified log, and information indicating a deleted part of information included in the non-reference log that is identical to the information included in the reference log; and
  a reception unit configured to receive the reference log, the modified log, and the information indicating a deleted part of information included in the non-reference log that is identical to the information included in the reference log.

A log acquisition method according to one example aspect of the present disclosure includes:
  defining one of a plurality of cells managed by a radio base station as a reference cell, and generating a modified log in which information identical to information included in a reference log that is associated with the reference cell is deleted from information included in a non-reference log that is associated with a non-reference cell, the non-reference cell being a cell other than the reference cell; and
  outputting the reference log, the modified log, and information indicating a deleted part of the information included in the non-reference log that is identical to the information included in the reference log.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

The present disclosure will be described hereinafter with reference to example embodiments of the present disclosure.

However, the following example embodiments are not intended to limit the scope of the disclosure according to the claims. Further, all the components/configurations described in the example embodiments are not necessarily indispensable as means for solving the problem. The same elements are denoted by the same reference numerals or symbols throughout the drawings, and redundant descriptions are omitted as necessary.

First Example Embodiment

Figure 1:
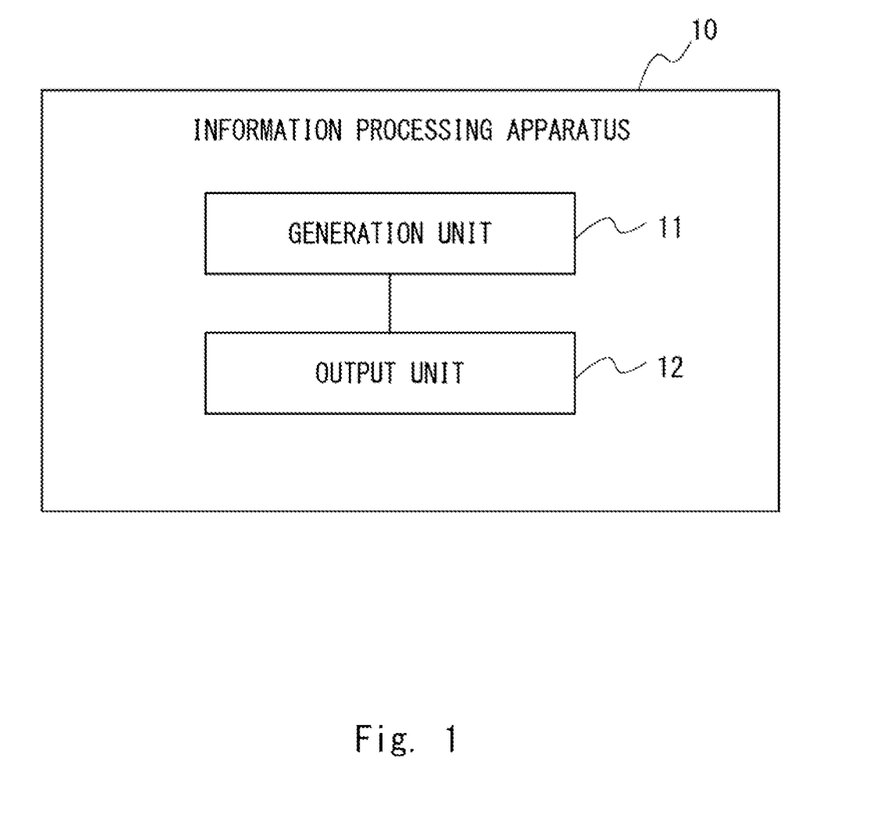
FIG. 1 is a block diagram showing a configuration of an information processing apparatus according to a first example embodiment.

A first example embodiment of the present disclosure will be described below with reference to the drawings. FIG. 1 is a block diagram showing a configuration of an information processing apparatus according to the first example embodiment. An information processing apparatus 10 according to the first example embodiment includes a generation unit 11 and an output unit 12.

The generation unit 11 defines one of a plurality of cells managed by a radio base station as a reference cell. Note that each of the plurality of cells managed by the radio base station other than the reference cell is referred to as a non-reference cell. A log associated with the reference cell is referred to as a reference log, and a log associated with the non-reference cell is referred to as a non-reference log.

The generation unit 11 generates a modified log in which information identical to information included in the reference log is deleted from information included in the non-reference log. Note that information included in the non-reference log that is identical to the information included in the reference log is referred to as deletion information. Further, the length of deleted information is referred to as a deletion data length.

Figure 2:
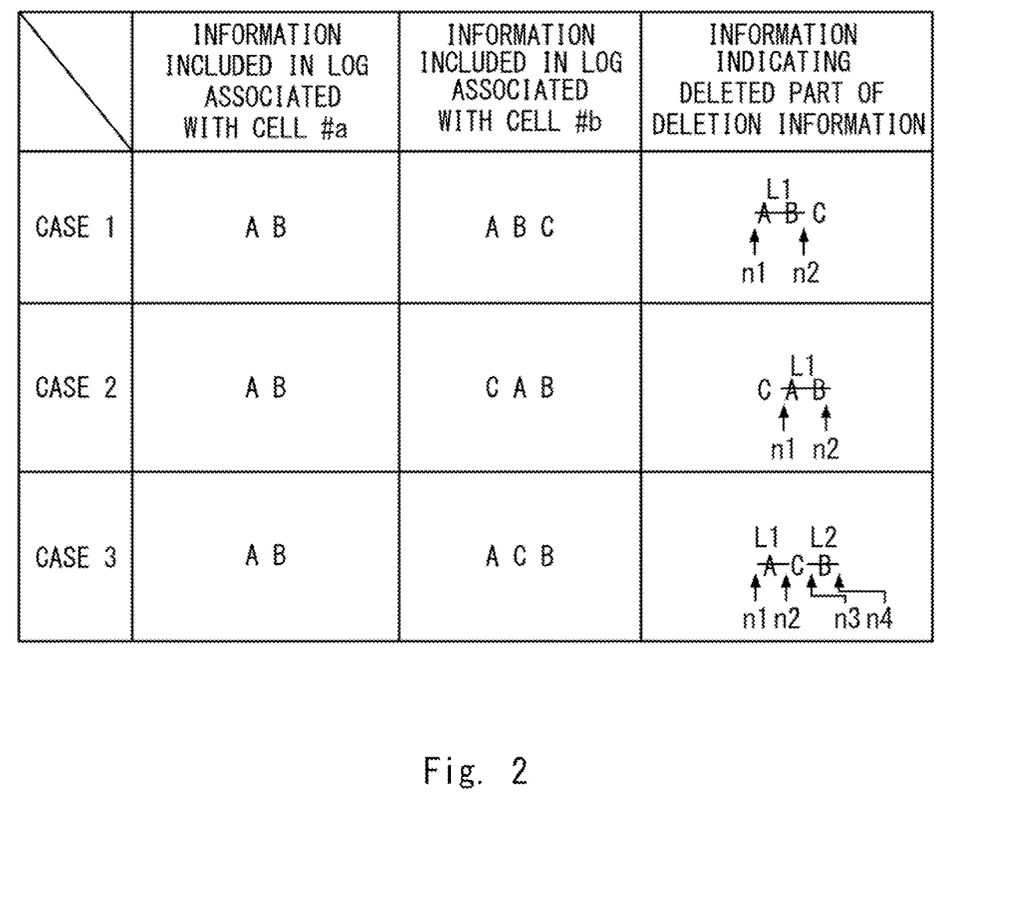
FIG. 2 is a diagram showing information included in a log associated with a cell #a and information included in a log associated with a cell #b according to the first example embodiment.

Information included in a modified log will be described with reference to FIG. 2. FIG. 2 is a diagram showing information included in a log associated with a cell #a and information included in a log associated with a cell #b according to the first example embodiment. Each of information of A, information of B, and information of C in FIG. 2 indicates parameters composed of at least one or more pieces of information. In FIG. 2, a reference cell is the cell #a. In all cases, information identical to the information included in the cell #a and the information included in cell #b is "AB". In other words, deletion information is "AB" and information included in a modified log is "C".

Information indicating a deleted part of deletion information will be described with reference to FIG. 2. When the deletion information "AB" is concatenated as shown in the cases 1 and 2, the beginning of "AB" is a starting point n1 and the end of "AB" is a position n2. In these cases, a deletion data length L1 is the length of "AB".

On the other hand, when the deletion information "AB" is not concatenated as shown in the case 3, the beginning of "A" is the starting point n1 and the end of "A" is the position n2. In this case, the deletion data length L1 is the length of "A". Further, the beginning of "B" is a starting point n3, and the end of "B" is a position n4. A deletion data length L3 is the length of "B."

The output unit 12 outputs a reference log, a modified log, and information indicating a deleted part of deletion information. For example, the output unit 12 may output a reference log, a modified log, and information indicating a deleted part of deletion information to a display. As another example, the output unit 12 may transmit a reference log, a modified log, and information indicating a deleted part of deletion information to another terminal apparatus.

Figure 3:
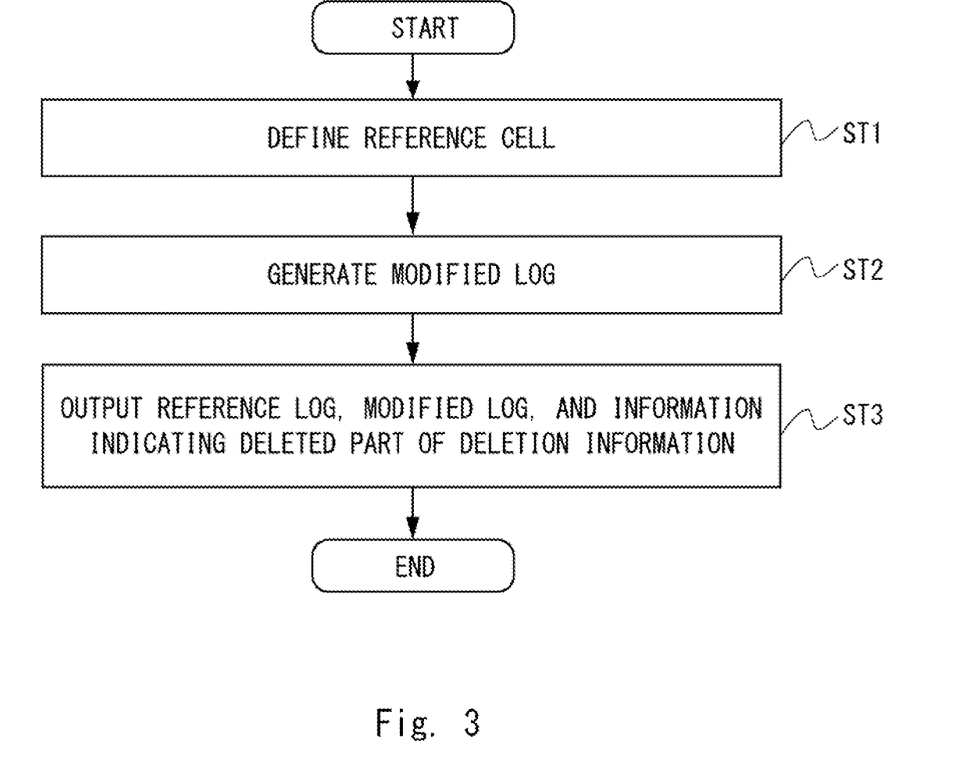
FIG. 3 is a flowchart showing a flow of a log acquisition method according to the first example embodiment.

Next, a log acquisition method according to the first example embodiment will be described. FIG. 3 is a flowchart showing a flow of the log acquisition method according to the first example embodiment. First, the generation unit 11 defines one of a plurality of cells managed by the radio base station cell as a reference cell (ST1). Next, the generation unit 11 generates a modified log in which information identical to information included in the reference log is deleted from information included in the non-reference log (ST2). Next, the output unit 12 outputs the reference log defined by the generation unit 11, the modified log generated by the generation unit 11, and information indicating a deleted part of deletion information (ST3).

As described above, the information processing apparatus 10 according to the first example embodiment deletes information identical to information included in the reference log from information included in the log associated with a plurality of cells managed by the radio base station, and outputs it. Therefore, the capacity of information included in the log and an information transfer time can be reduced. Thus, it is possible to perform efficient log acquisition processing since an increase in information included in the log can be prevented or reduced even when the number of cells managed by the radio base station increases.

Second Example Embodiment

Figure 4:
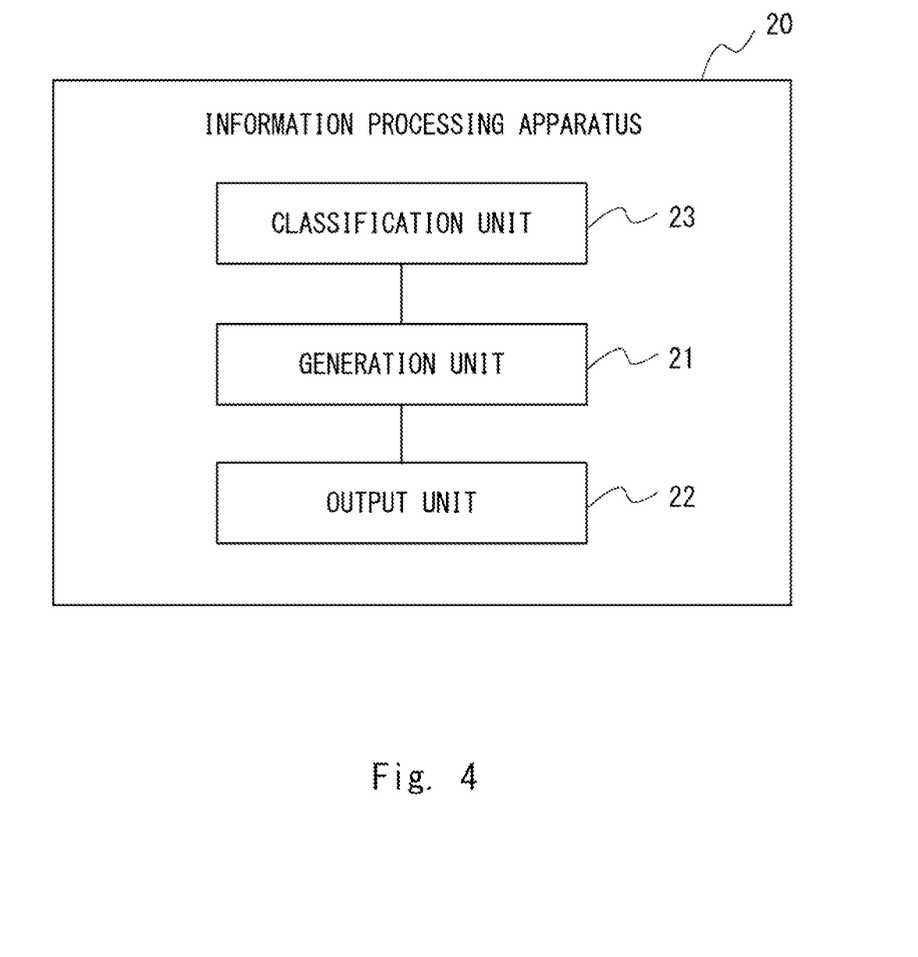
FIG. 4 is a block diagram showing a configuration of an information processing apparatus 20 according to a second example embodiment.

A second example embodiment of the present disclosure will be described below with reference to the drawings. FIG. 4 is a block diagram showing a configuration of an information processing apparatus 20 according to the second example embodiment. The information processing apparatus 20 according to the second example embodiment includes a classification unit 23, a generation unit 21, and an output unit 22.

In the following description, it is assumed that a radio base station manages a plurality of cells.

The classification unit 23 classifies a plurality of cells into a plurality of cell groups based on a communication type. The communication type is, for example, a radio access method, a transmission and reception method, a frequency bandwidth, or a vendor type. The radio access method is, for example, Long Term Evolution (LTE) or New Radio (NR). The transmission and reception method is, for example, Time Division Duplex (TDD) or Frequency Division Duplex (FDD).

The classification unit 23 classifies a plurality of cells into cell groups based on a preset communication type. The classification unit 23 classifies the plurality of cells into at least two or more cell groups.

The generation unit 21 defines one of a plurality of cells belonging to the same cell group as a reference cell. The reference cell is defined for each cell group. Note that the plurality of cells belonging to the same cell group other than the reference cell are referred to as non-reference cells. A log associated with the reference cell is referred to as a reference log, and a log associated with the non-reference cell is referred to as a non-reference log.

The generation unit 21 generates a modified log in which information identical to information included in the reference log is deleted from information included in the non-reference log. The modified log is generated for each cell group. Note that information included in the non-reference log that is identical to information included in the reference log is referred to as deletion information. Further, the length of deleted information is referred to as a deletion data length.

When information included in the reference log differs from the information included in the non-reference log, the generation unit 21 generates a modified log in which information identical to information included in the reference log is deleted from information included in the non-reference log.

In contrast, when information included in the reference log includes all information included in the non-reference log, the generation unit 21 does not generate a modified log.

The output unit 22 outputs, for each cell group, the reference log defined by the generation unit 21, the modified log generated by the generation unit 21, and information indicating a deleted part of deletion information. For example, the output unit 22 may output the reference log, the modified log, and information indicating a deleted part of deletion information to a display. As another example, the output unit 22 may transmit the reference log, the modified log, and information indicating a deleted part of deletion information to another terminal apparatus.

The information indicating a deleted part of deletion information is indicated by using a starting point of the information included in the non-reference log that is identical to the information included in the reference log and a length of deleted information.

Further, the information indicating a deleted part of deletion information may be indicated by using a starting point and an ending point of information included in the non-reference log that is identical to the information included in the reference log.

The output unit 22 may output the reference log defined by the generation unit 21, the modified log generated by the generation unit 21, and information indicating a deleted part of deletion information in accordance with details of a request from a user. A user can change the details of a request for each cell group. For example, the output unit 22 outputs the reference log defined by the generation unit 21 and the modified log generated by the generation unit 21 corresponding to the command inputs of the details to be investigated during operation verification.

Log acquisition processing performed by the information processing apparatus 20 will be described below using a case in which the number of cells is five as an example. Further, radio access methods in a plurality of cells are a cell #1=LTE, a cell #2=NR, a cell #3=LTE, a cell #4=NR, and a cell #5=NR, respectively.

The classification unit 23 classifies the cells #1 to #5 into cell groups based on a preset communication type. In this example, the preset communication type is a radio access method. The classification unit 23 classifies the cells #1 and #3 into a cell group A and the cells #2, #4, and #5 into a cell group B based on the radio access method.

Figure 5:
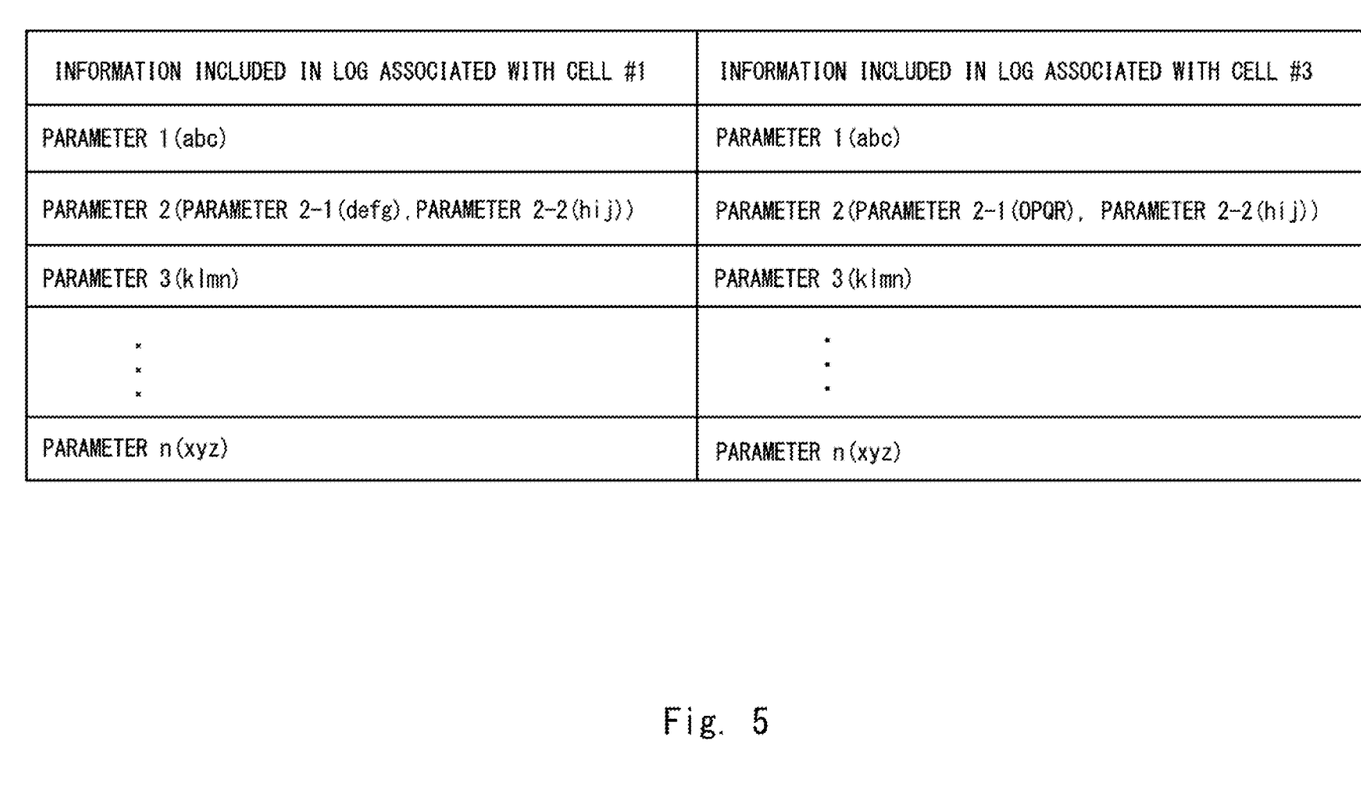
FIG. 5 shows information included in a log associated with cells #1 and #3 according to the second example embodiment.
Figure 6:
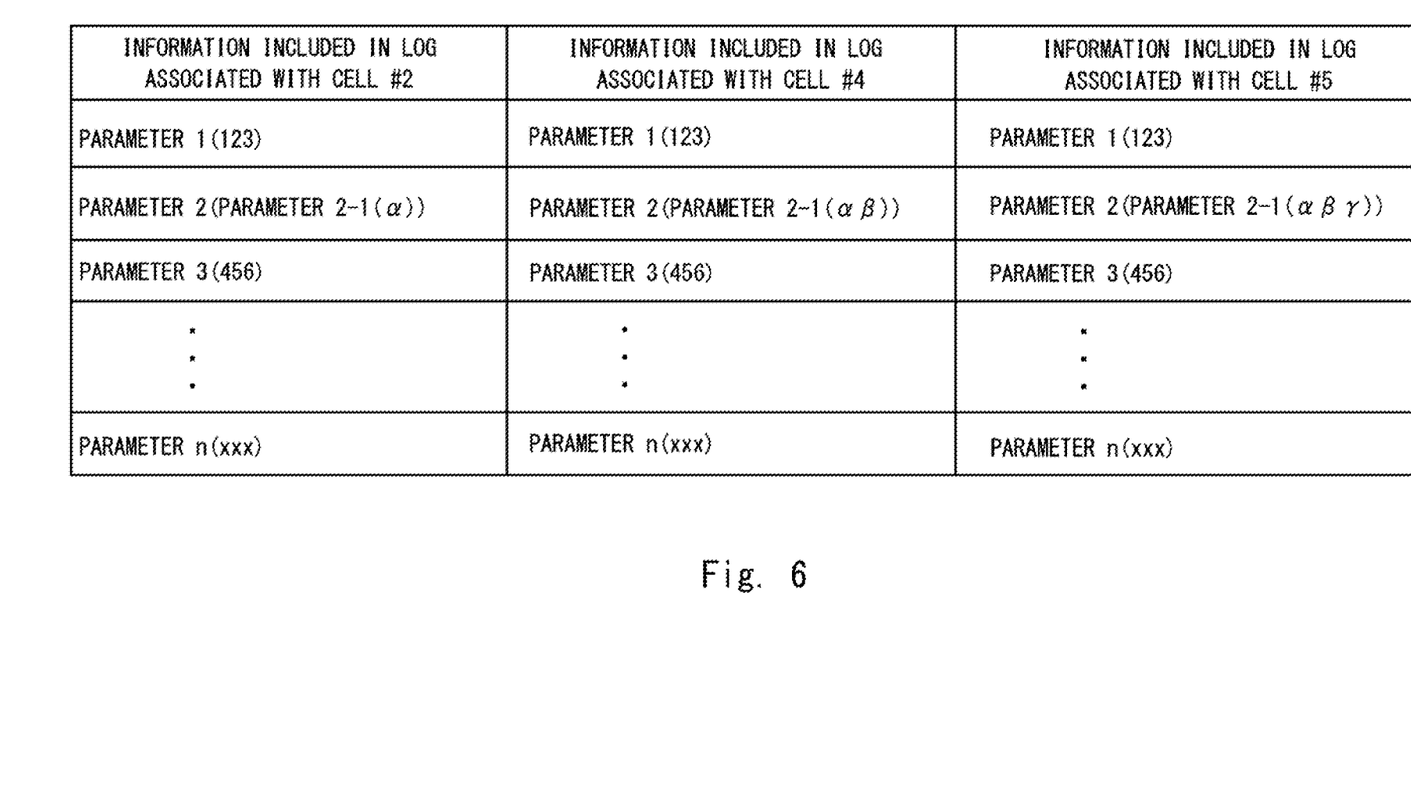
FIG. 6 shows information included in a log associated with cells #2, #4, and #5 according to the second example embodiment.

Next, the generation unit 21 will be described with reference to FIGS. 5 and 6. FIG. 5 shows information included in a log associated with the cells #1 and #3 according to the second example embodiment. FIG. 6 shows information included in a log associated with the cells #2, #4, and #5 according to the second example embodiment. The information shown in FIGS. 5 and 6 indicates parameter names and parameter values that are general components of log information. The log information in the same row in the cells shown in FIGS. 5 and 6 indicates parameters indicating the same type of information. The parameters indicating the same type of information are, for example, cell identification information and base station information.

In this example, a reference cell in the cell group A is the cell #1 and a reference cell in the cell group B is the cell #2.

First, a modified log in the cell group A will be described with reference to FIG. 5. Regarding information included in the log associated with the cells #1 and #3, the generation unit 21 compares the same rows in these cells. The difference between the information included in the log of the cell #1 and the information included in the log of the cell #3 is that the cell #1 includes "parameter 2-1 (defg)" while the cell #3 includes "parameter 2-1 (OPQR)". That is, a modified log is "OPQR".

Next, information indicating a deleted part of deletion information in the cell group A will be described with reference to FIG. 5. Note that deletion information is included in the cell #3, which is a non-reference log. The starting point n1 (#3) of the deletion information included in the cell 3 may be indicated by using an address indicating the beginning of "parameter 1" in the cell #3. An ending point n2 (#3) of the deletion information included in the cell 3 may be indicated by using an address indicating the end of "parameter 2-1 ("in the cell #3. In this case, the deletion data length L1 is the length of "parameter 1 (abc), parameter 2 (parameter 2-1 (".

The starting point n3 (#3) of the deletion information included in the cell 3 may be indicated by using an address indicating the beginning of"), parameter 2-2" in the cell #3. Further, an ending point n4 (#3) of the deletion information included in the cell 3 may be indicated by using an address indicating the "parameter n (xyz)" in the cell #3. In this case, a deletion data length L2 is the length of"), parameter 2-2 (hij)), parameter 3 (klmn) . . . parameter n (xyz)".

Next, a modified log in the cell group B will be described with reference to FIG. 6. A reference cell in the cell group B is the cell #2. The information included in the log associated with the cell #2 is compared to the information included in the log associated with the cell #4, and the information included in the log associated with the cell #2 is compared to the information included in the log associated with the cell #5. Like in the case of the cell group A, regarding information included in the log associated with the cells #2 and #4, the generation unit 21 compares the same rows in these cells. Further, regarding information included in the log associated with the cells #2 and #5, the generation unit 21 compares the same rows in these cells.

The difference between log information of the cell #2 and log information of the cell #4 is that the cell #2 includes "parameter 2-1 ($\alpha$)" while the cell #4 includes "parameter 2-1 ($\alpha\beta$)". On the other hand, the difference between the log information of the cell #2 and log information of the cell #5 is that the cell #2 includes "parameter 2-1 ($\alpha$)" while the cell #5 includes "parameter 2-1 ($\alpha\beta\gamma$)". That is, modified logs are "$\beta$" and "$\beta\gamma$".

Next, information indicating a deleted part of deletion information in the cell group B will be described with reference to FIG. 6. Note that deletion information is included in each of the cells #4 and #5, which are non-reference logs.

The starting point n1 of the deletion information included in the cell #4 may be indicated by using an address indicating the beginning of "parameter 1" in the cell #4. Further, the ending point n2 of the deletion information included in the cell #4 may be indicated by using an address indicating the end of "parameter 2-1 ($\alpha$" in the cell #4. In this case, the deletion data length L1 is the length of "parameter 1 (123), parameter 2 (parameter 2-1 ($\alpha$".

The starting point n3 of the deletion information included in the cell #4 may be indicated by using an address indicating the beginning of ")" in the cell #4. Further, the ending point n4 of the deletion information included in the cell #4 may be indicated by using an address indicating the end of "parameter n (x x x)" in the cell #4. In this case, the deletion data length L2 is the length of ")), parameter 3 (456), . . . parameter n (x x x)".

Meanwhile, the starting point n1 of the deletion information included in the cell #5 may be indicated by using an address indicating the beginning of "parameter 1" in the cell #5. Further, the ending point n2 of the deletion information included in the cell #5 may be indicated by using an address indicating the end of "parameter 2-1 ($\alpha$" in the cell #5. In this case, the deletion data length L1 is the length of "parameter 1 (123), parameter 2 (parameter 2-1 ($\alpha$".

The starting point n3 of the deletion information included in the cell #5 may be indicated by using an address indicating the beginning of "))" in the cell #5. Further, the ending point n4 of the deletion information included in the cell #5 may be indicated by using an address indicating the end of "parameter n (x x x)" in the cell #5. In this case, the deletion data length L2 is the length of ")), parameter 3 (456), . . . parameter n (x x x)".

The output unit 22 outputs the reference logs, the modified logs, and information indicating a deleted part of the deletion information in the cell groups A and B.

In this case, the information indicating a deleted part of the deletion information is indicated by using the starting point of the deletion information and the deletion data length. Further, the information indicating a deleted part of the deletion information may be indicated by using the starting point and the ending point of the deletion information.

That is, the output unit 22 outputs the information included in the log associated with the cell #1 as the reference log, "OPQR" as the modified log, and the starting point of the deletion information and the deletion data length in the cell #3 as the starting point of the deletion information and the deletion data length. Alternatively, the output unit 22 outputs the information included in the log associated with the cell #1 as the reference log, "OPQR" as the modified log, and the starting point and the ending point of the deletion information in the cell #3 as the starting point and the ending point of the deletion information.

Further, the output unit 22 outputs the information included in the log associated with the cell #2 as the reference log, "$\beta$" and "$\beta\gamma$" as the modified logs, and the starting point of the deletion information and the deletion data length in each of the cells #4 and #5 as the starting point of the deletion information and the deletion data length. Alternatively, the output unit 22 outputs the information included in the log associated with the cell #2 as the reference log, "$\beta$" and "$\beta\gamma$" as the modified logs, and the starting point and the ending point of the deletion information in each of the cells #4 and #5 as the starting point and the ending point of the deletion information.

Figure 7:
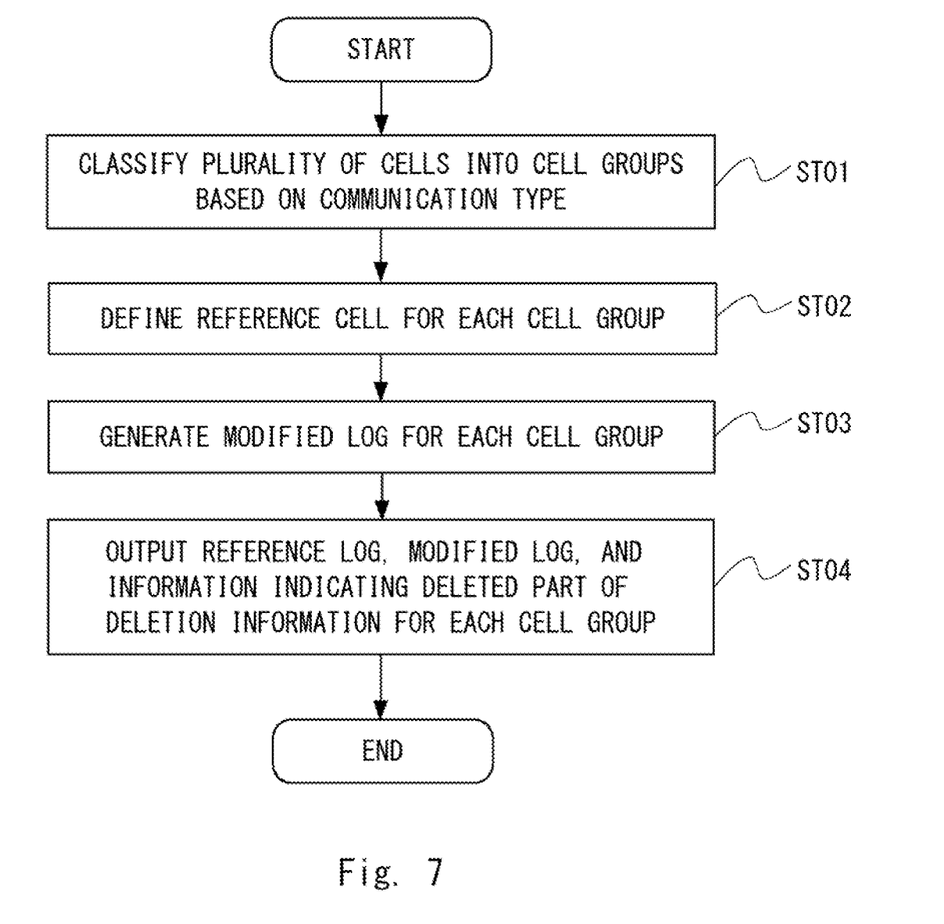
FIG. 7 is a flowchart showing a flow of a log acquisition method according to the second example embodiment.

Next, a log acquisition method according to the second example embodiment will be described. FIG. 7 is a flowchart showing a flow of the log acquisition method according to the second example embodiment. First, the classification unit 23 classifies a plurality of cells into cell groups based on a communication type (ST01). Next, the generation unit 21 defines, for each cell group, one of the plurality of cells belonging to the same cell group as a reference cell (ST02). Next, the generation unit 21 generates, for each cell group, a modified log in which information identical to information included in the reference log is deleted from information included in the non-reference log (ST03). Then, the output unit 22 outputs, for each cell group, the reference log defined by the generation unit 21, the modified log generated by the generation unit 21, and information indicating a deleted part of deletion information (ST04).

As described above, the information processing apparatus 20 according to the second example embodiment classifies a plurality of cells managed by a radio base station based on a communication type. The information processing apparatus 20 deletes information identical to information included in the reference log from information included in the log associated with the cells belonging to the same classification. The information processing apparatus 20 outputs, for each cell group, the reference log, the modified log, and information indicating a deleted part of deletion information. Therefore, the capacity of information included in the log and an information transfer time can be reduced. Thus, it is possible to perform efficient log acquisition processing since an increase in information included in the log can be prevented or reduced even when the number of cells managed by the radio base station increases.

Third Example Embodiment

Figure 8:
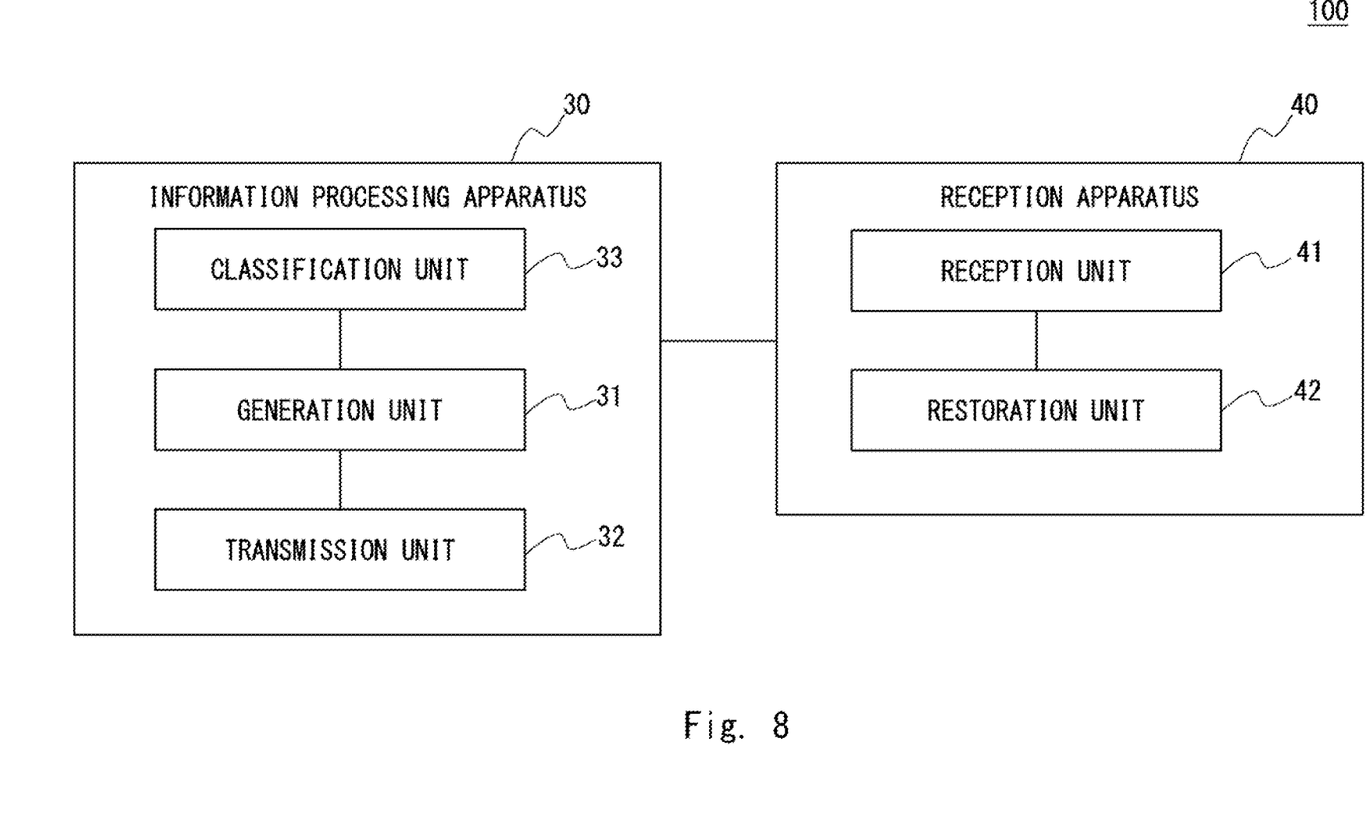
FIG. 8 is a block diagram of an information processing system 100 according to a third example embodiment.

A third example embodiment of the present disclosure will be described below with reference to the drawings. FIG. 8 is a block diagram of an information processing system 100 according to the third example embodiment. The information processing system 100 according to the third example embodiment includes an information processing apparatus 30 and a reception apparatus 40.

The information processing apparatus 30 includes a classification unit 33, a generation unit 31, and a transmission unit 32. The classification unit 33, the generation unit 31, and the transmission unit 32 are similar to the classification unit 23, the generation unit 21, and the output unit 22 according to the second example embodiment, and thus the descriptions thereof will be omitted.

Further, the information processing apparatus 30 may not include the classification unit 33. In this case, the generation unit 31 and the transmission unit 32, respectively, are similar to the generation unit 11 and the output unit 12 according to the first example embodiment.

The reception apparatus 40 includes a reception unit 41 and a restoration unit 42. The reception apparatus 40 may not include the restoration unit 42.

The reception unit 41 receives a reference log, a modified log, and information indicating a deleted part of information included in the non-reference log that is identical to the information included in the reference log, which are output by the information processing apparatus 30. A transmission and reception method may be a wired or wireless network. The wireless network includes, for example, a wireless communication network using a communication line standard such as LTE. The wireless network may include a wireless communication network such as a wireless Local Area Network (LAN) or a fifth generation mobile communication system.

The restoration unit 42 restores the non-reference log by combining, based on the information indicating a deleted part, the information included in the non-reference log that is identical to the information included in the reference log with information included in the modified log. For example, in the cell #3 shown in FIG. 5, the restoration unit 42 restores the cell #3 by combining the deletion information with "OPQR," which is the modified log, based on the starting point n1, the ending point n2, the starting point n3, and the ending point n4, which are pieces of information indicating a deleted part. Alternatively, the restoration unit 42 restores the cell #3 by combining the deletion information with "OPQR," which is the modified log, based on the starting point n1, the starting point n3, the deletion data length L1, and the deletion data length L2, which are the information indicating a deleted part.

As described above, the information processing system 100 deletes information identical to information included in the reference log from information included in the log associated with a plurality of cells managed by the radio base station. The information processing system 100 outputs the reference log, the modified log, and information indicating a deleted part of deletion information. The information processing system 100 according to the third example embodiment restores the non-reference log by combining, based on the information indicating a deleted part, the information included in the non-reference log that is identical to the information included in the reference log with information included in the modified log. Therefore, the capacity of information included in the log and an information transfer time can be reduced, and operations can be verified by performing the restoration at the receiving end.

Steps ST1 to ST3 and steps ST01 to ST04 described above may be software or modules in which processing is executed by causing a processor to execute a program stored in a memory. These steps may be executed by a program.

Note that the program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a Random-Access Memory (RAM), a Read-Only Memory (ROM), a flash memory, a Solid-State Drive (SSD) or other types of memory technologies, a CD-ROM, a Digital Versatile Disc (DVD), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Although the present disclosure has been described above with reference to the above example embodiments, the present disclosure is not limited only to the configurations of the above-described example embodiments, and obviously includes various modifications, changes, and combinations that can be made by a person skilled in the art within the scope of the claims of the present application.

The whole or part of the example embodiments disclosed above can be described as, but not limited to, the following supplementary notes.

(Supplementary Note 1)
An information processing apparatus comprising:
a generation unit configured to define one of a plurality of cells managed by a radio base station as a reference cell, and generate a modified log in which information identical to information included in a reference log that is associated with the reference cell is deleted from information included in a non-reference log that is associated with a non-reference cell, the non-reference cell being a cell other than the reference cell; and
an output unit configured to output the reference log, the modified log, and information indicating a deleted part of the information included in the non-reference log that is identical to the information included in the reference log.

(Supplementary Note 2)
The information processing apparatus according to Supplementary Note 1, further comprising a classification unit configured to classify the plurality of cells into cell groups based on a communication type, wherein
the generation unit defines one of the cells belonging to the same cell group as a reference cell, and generates, for each of the cell groups, a modified log in which information identical to information included in a reference log that is associated with the reference cell is deleted from information included in a non-reference log that is associated with a non-reference cell, the non-reference cell being a cell other than the reference cell, and
the output unit outputs, for each of the cell groups, the reference log, the modified log, and information indicating a deleted part of the information included in the non-reference log that is identical to the information included in the reference log.

(Supplementary Note 3)
The information processing apparatus according to Supplementary Note 2, wherein the communication type is a radio access method, a transmission and reception method, a frequency bandwidth, or a vendor type.

(Supplementary Note 4)
The information processing apparatus according to any one of Supplementary notes 1 to 3, wherein when the information included in the reference log includes all the information included in the non-reference log, the generation unit does not generate the modified log.

(Supplementary Note 5)
The information processing apparatus according to any one of Supplementary notes 1 to 3, wherein the information indicating a deleted part is indicated by using a starting point of the information included in the non-reference log that is identical to the information included in the reference log and a length of the deleted information.

(Supplementary Note 6)
The information processing apparatus according to any one of Supplementary notes 1 to 3, wherein the information indicating a deleted part is indicated by using starting and ending points of the information included in the non-reference log that is identical to the information included in the reference log.

(Supplementary Note 7)
The information processing apparatus according to any one of Supplementary notes 1 to 3, wherein when the information included in the reference log differs from the information included in the non-reference log, the generation unit generates the modified log in which information identical to the information included in the reference log is deleted from the information included in the non-reference log.

(Supplementary Note 8)
The information processing apparatus according to any one of Supplementary notes 1 to 3, wherein the output unit outputs the reference log and the modified log in accordance with details of a request from a user.

(Supplementary Note 9)
An information processing system comprising:
an information processing apparatus comprising: a generation unit configured to define one of a plurality of cells managed by a radio base station as a reference cell, and generate a modified log in which information identical to information included in a reference log that is associated with the reference cell is deleted from information included in a non-reference log that is associated with a non-reference cell, the non-reference cell being a cell other than the reference cell; and an transmission unit configured to transmit the reference log, the modified log, and information indicating a deleted part of information included in the non-reference log that is identical to the information included in the reference log; and a reception unit configured to receive the reference log, the modified log, and the information indicating a deleted part of information included in the non-reference log that is identical to the information included in the reference log.

(Supplementary Note 10)

The information processing system according to Supplementary Note 9, wherein the information processing apparatus further comprises a classification unit configured to classify the plurality of cells into cell groups based on a communication type, the generation unit defines one of the cells belonging to the same cell group as a reference cell, and generates, for each of the cell groups, a modified log in which information identical to information included in a reference log that is associated with the reference cell is deleted from information included in a non-reference log that is associated with a non-reference cell, the non-reference cell being a cell other than the reference cell, and the transmission unit outputs, for each of the cell groups, the reference log, the modified log, and information indicating a deleted part of the information included in the non-reference log that is identical to the information included in the reference log.

(Supplementary Note 11)

The information processing system according to Supplementary Note 9 or further comprising a restoration unit configured to restore the non-reference log by combining, based on the information indicating a deleted part, the information included in the non-reference log that is identical to the information included in the reference log with information included in the modified log.

(Supplementary Note 12)

A log acquisition method comprising:

defining one of a plurality of cells managed by a radio base station as a reference cell, and generating a modified log in which information identical to information included in a reference log that is associated with the reference cell is deleted from information included in a non-reference log that is associated with a non-reference cell, the non-reference cell being a cell other than the reference cell; and outputting the reference log, the modified log, and information indicating a deleted part of the information included in the non-reference log that is identical to the information included in the reference log.

(Supplementary Note 13)

The log acquisition method according to Supplementary Note 12, comprising:

classifying the plurality of cells into cell groups based on a communication type;

defining one of the cells belonging to the same cell group as a reference cell, and generating, for each of the cell groups, a modified log in which information identical to information included in a reference log that is associated with the reference cell is deleted from information included in a non-reference log that is associated with a non-reference cell, the non-reference cell being a cell other than the reference cell; and outputting, for each of the cell groups, the reference log, the modified log, and information indicating a deleted part of the information included in the non-reference log that is identical to the information included in the reference log.

(Supplementary Note 14)

A log acquisition program for causing a computer to:

define one of a plurality of cells managed by a radio base station as a reference cell, and generate a modified log in which information identical to information included in a reference log that is associated with the reference cell is deleted from information included in a non-reference log that is associated with a non-reference cell, the non-reference cell being a cell other than the reference cell; and output the reference log, the modified log, and information indicating a deleted part of the information included in the non-reference log that is identical to the information included in the reference log.

(Supplementary Note 15)

The log acquisition program according to Supplementary Note 14 for causing a computer to:

classify the plurality of cells into cell groups based on a communication type;

define one of the cells belonging to the same cell group as a reference cell, and generate, for each of the cell groups, a modified log in which information identical to information included in a reference log that is associated with the reference cell is deleted from information included in a non-reference log that is associated with a non-reference cell, the non-reference cell being a cell other than the reference cell; and output, for each of the cell groups, the reference log, the modified log, and information indicating a deleted part of the information included in the non-reference log that is identical to the information included in the reference log.

What is claimed is:

1. An information processing apparatus comprising:
at least one memory storing instructions; and
at least one processor configured to execute the instructions to:
define one of a plurality of cells managed by a radio base station as a reference cell, and generate a modified log in which information identical to information included in a reference log that is associated with the reference cell is deleted from information included in a non-reference log that is associated with a non-reference cell, the non-reference cell being a cell other than the reference cell; and
output the reference log, the modified log, and information indicating a deleted part of the information included in the non-reference log that is identical to the information included in the reference log.

2. The information processing apparatus according to claim 1, wherein the at least one processor is configured to execute the instructions to:
classify the plurality of cells into cell groups based on a communication type,
define one of the cells belonging to the same cell group as a reference cell, and generate, for each of the cell groups, a modified log in which information identical to information included in a reference log that is associated with the reference cell is deleted from information included in a non-reference log that is associated with a non-reference cell, the non-reference cell being a cell other than the reference cell, and output, for each of the cell groups, the reference log, the modified log, and information indicating a deleted part of the information included in the non-reference log that is identical to the information included in the reference log.

3. The information processing apparatus according to claim 2, wherein the communication type is a radio access method, a transmission and reception method, a frequency bandwidth, or a vendor type.

4. The information processing apparatus according to claim 1, wherein the at least one processor is configured to execute the instructions to not generate the modified log when the information included in the reference log includes all the information included in the non-reference log.

5. The information processing apparatus according to claim 1, wherein the information indicating a deleted part is indicated by using a starting point of the information included in the non-reference log that is identical to the information included in the reference log and a length of the deleted information.

6. The information processing apparatus according to claim 1, wherein the information indicating a deleted part is indicated by using starting and ending points of the information included in the non-reference log that is identical to the information included in the reference log.

7. The information processing apparatus according to claim 1, wherein the at least one processor is configured to execute the instructions to generate the modified log in which information identical to the information included in the reference log is deleted from the information included in the non-reference log when the information included in the reference log differs from the information included in the non-reference log.

8. The information processing apparatus according to claim 1, wherein the at least one processor is configured to execute the instructions to output the reference log and the modified log in accordance with details of a request from a user.

9. An information processing system comprising:
an information processing apparatus and a reception apparatus
wherein the information processing apparatus comprises at least one memory storing instructions; and at least one processor configured to execute the instructions to:
define one of a plurality of cells managed by a radio base station as a reference cell, and generate a modified log in which information identical to information included in a reference log that is associated with the reference cell is deleted from information included in a non-reference log that is associated with a non-reference cell, the non-reference cell being a cell other than the reference cell; and transmit the reference log, the modified log, and information indicating a deleted part of information included in the non-reference log that is identical to the information included in the reference log; and
wherein the reception apparatus comprises at least one memory storing instructions; and at least one processor configured to execute the instructions to:

receive the reference log, the modified log, and the information indicating a deleted part of information included in the non-reference log that is identical to the information included in the reference log.

10. The information processing system according to claim 9, wherein the at least one processor is configured to execute the instructions to:
classify the plurality of cells into cell groups based on a communication type,
define one of the cells belonging to the same cell group as a reference cell, and generate, for each of the cell groups, a modified log in which information identical to information included in a reference log that is associated with the reference cell is deleted from information included in a non-reference log that is associated with a non-reference cell, the non-reference cell being a cell other than the reference cell, and
transmit, for each of the cell groups, the reference log, the modified log, and information indicating a deleted part of the information included in the non-reference log that is identical to the information included in the reference log.

11. The information processing system according to claim 9, wherein the at least one processor is configured to execute the instructions to restore the non-reference log by combining, based on the information indicating a deleted part, the information included in the non-reference log that is identical to the information included in the reference log with information included in the modified log.

12. A log acquisition method comprising:
defining one of a plurality of cells managed by a radio base station as a reference cell, and generating a modified log in which information identical to information included in a reference log that is associated with the reference cell is deleted from information included in a non-reference log that is associated with a non-reference cell, the non-reference cell being a cell other than the reference cell; and
outputting the reference log, the modified log, and information indicating a deleted part of the information included in the non-reference log that is identical to the information included in the reference log.

13. The log acquisition method according to claim 12, comprising:
classifying the plurality of cells into cell groups based on a communication type;
defining one of the cells belonging to the same cell group as a reference cell, and generating, for each of the cell groups, a modified log in which information identical to information included in a reference log that is associated with the reference cell is deleted from information included in a non-reference log that is associated with a non-reference cell, the non-reference cell being a cell other than the reference cell; and
outputting, for each of the cell groups, the reference log, the modified log, and information indicating a deleted part of the information included in the non-reference log that is identical to the information included in the reference log.

* * * * *